(12) United States Patent
Nakamura et al.

(10) Patent No.: US 10,689,300 B2
(45) Date of Patent: Jun. 23, 2020

(54) CERAMIC BONDED BODY

(71) Applicant: KYOCERA CORPORATION, Kyoto-shi, Kyoto (JP)

(72) Inventors: Kiyotaka Nakamura, Kirishima (JP); Masayuki Moriyama, Kirishima (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 15/763,457

(22) PCT Filed: Sep. 28, 2016

(86) PCT No.: PCT/JP2016/078641
§ 371 (c)(1),
(2) Date: Mar. 27, 2018

(87) PCT Pub. No.: WO2017/057470
PCT Pub. Date: Apr. 6, 2017

(65) Prior Publication Data
US 2018/0237348 A1     Aug. 23, 2018

(30) Foreign Application Priority Data
Sep. 29, 2015   (JP) .................................. 2015-191536

(51) Int. Cl.
*C04B 37/00* (2006.01)
*B32B 18/00* (2006.01)

(52) U.S. Cl.
CPC ............ *C04B 37/003* (2013.01); *B32B 18/00* (2013.01); *C04B 37/00* (2013.01); *C04B 37/005* (2013.01);
(Continued)

(58) Field of Classification Search
CPC ...... C04B 37/003; C04B 37/00; C04B 37/005; C04B 37/006; C04B 2237/08;
(Continued)

(56) References Cited

U.S. PATENT DOCUMENTS

2003/0038166 A1* 2/2003 Gasse ...................... B23K 1/19
228/247
2014/0294692 A1* 10/2014 Kikuchi ................ F01N 3/2828
422/180
(Continued)

FOREIGN PATENT DOCUMENTS

EP   2784050 A2   10/2014
FR   2806405 A1    9/2001
(Continued)

OTHER PUBLICATIONS

International Search Report received for International Application No. PCT/JP2016/078641 dated Nov. 1, 2016, 2 pages.

*Primary Examiner* — Jonathan C Langman
(74) *Attorney, Agent, or Firm* — Viering, Jentschura & Partner MBB (57) ABSTRACT

A ceramic bonded body of the disclosure includes a first silicon carbide ceramics, a second silicon carbide ceramics, and a bonding layer positioned between the first silicon carbide ceramics and the second silicon carbide ceramics. The bonding layer contains 25 mass % or more metallic silicon, and 25 mass % or more silicon carbide assuming all components constituting the bonding layer as 100 mass %, and a total of the metallic silicon and the silicon carbide is 75 mass % or more, and the bonding layer further contains at least one of nickel silicide and chromium silicide.

5 Claims, 2 Drawing Sheets

(52) U.S. Cl.
CPC ........ *C04B 37/006* (2013.01); *B32B 2250/02* (2013.01); *B32B 2307/752* (2013.01); *C04B 2237/08* (2013.01); *C04B 2237/083* (2013.01); *C04B 2237/16* (2013.01); *C04B 2237/365* (2013.01); *C04B 2237/708* (2013.01); *C04B 2237/78* (2013.01)

(58) Field of Classification Search
CPC .......... C04B 2237/083; C04B 2237/16; C04B 2237/365; C04B 2237/708; C04B 2237/78; B32B 18/00; B32B 2250/02; B32B 2307/752
See application file for complete search history.

(56) References Cited

U.S. PATENT DOCUMENTS

2014/0296055 A1* 10/2014 Kikuchi ................ B01J 27/224
502/1
2016/0001526 A1 1/2016 Shino et al.

FOREIGN PATENT DOCUMENTS

| | | |
|---|---|---|
| JP | 2001-261459 A | 9/2001 |
| JP | 2003527292 A | 9/2003 |
| JP | 2014-198650 A | 10/2014 |
| WO | 2014133068 A1 | 9/2014 |

\* cited by examiner

CERAMIC BONDED BODY

RELATED APPLICATIONS

The present application is a national stage entry according to 35 U.S.C. § 371 of PCT application No.: PCT/JP2016/078641 filed on Sep. 28, 2016, which claims priority from Japanese application No.: 2015-191536 filed on Sep. 29, 2015 and is incorporated herein by reference in its entirety.

TECHNICAL FIELD

The present invention relates to a ceramic bonded body.

BACKGROUND ART

Since silicon carbide ceramics has excellent characteristics, such as high mechanical strength, heat resistance and corrosion resistance, they are used in wide fields. Furthermore, in recent years, as apparatuses and facilities equipped with members required to have these characteristics are made larger in size, the members themselves are required to be larger and longer and the shapes of the members are also required to be more complicated. However, it has been difficult to integrally form large, long and complicated moldings. Accordingly, countermeasures for the enlargement and elongation of the members themselves and for the complications in the shapes of the members have been taken by mutually bonding a plurality of sintered bodies.

For example, Patent Literature 1 has proposed a bonded body in which two or more silicon carbide ceramics members are bonded with silicon.

CITATION LIST

Patent Literature

Patent Literature 1: Japanese Unexamined Patent Publication JP-A 2001-261459

SUMMARY

A ceramic bonded body of the present disclosure includes a first silicon carbide ceramics, a second silicon carbide ceramics, and a bonding layer between the first silicon carbide ceramics and the second silicon carbide ceramics. The bonding layer contains 25 mass % or more metallic silicon and 25 mass % or more silicon carbide with respect to 100 mass % of all components in the bonding layer, and a total of the metallic silicon and the silicon carbide is 75 mass % or more. The bonding layer further contains at least one of nickel silicide and chromium silicide.

DESCRIPTION OF EMBODIMENTS

In recent years, ceramic bonded bodies have been frequently used in portions to be exposed to a working environment of corrosive gas and liquid. Hence, there is a demand for ceramic bonded bodies having high corrosion resistance and durability so that the lowering of the bonding strength at bonding portions is small and being able to be used for an extended period of time even in a working environment of corrosive gas and liquid.

The ceramic bonded body of the disclosure has high corrosion resistance and durability. The ceramic bonded body of the disclosure will be described below in detail with reference to the drawings.

Figure 1:
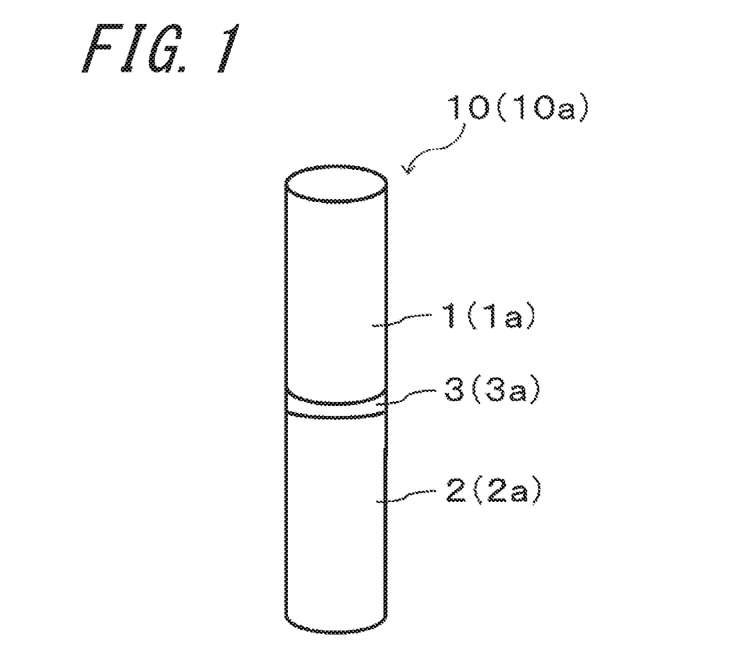
FIG. 1 is a perspective view showing an example of a ceramic bonded body of the disclosure.
Figure 2:
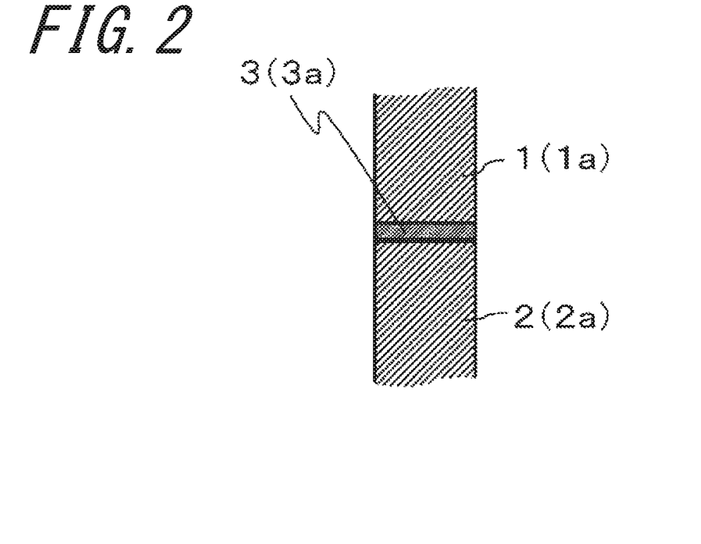
FIG. 2 is a sectional view showing a bonding portion of the ceramic bonded body shown in FIG. 1.
Figure 3:
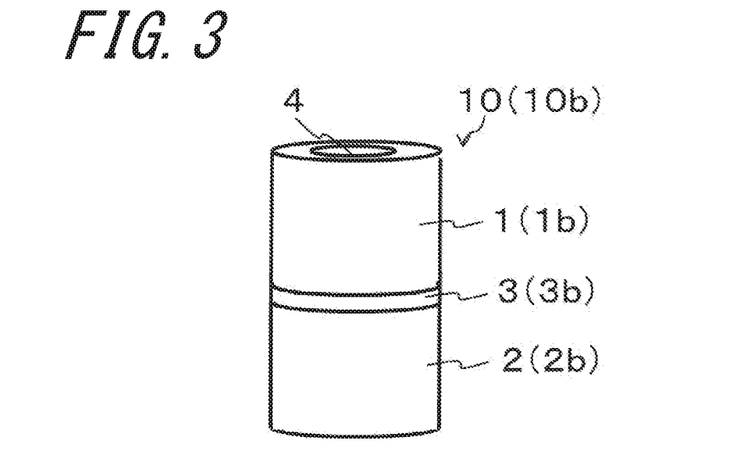
FIG. 3 is a perspective view showing another example of the ceramic bonded body of the disclosure.
Figure 4:
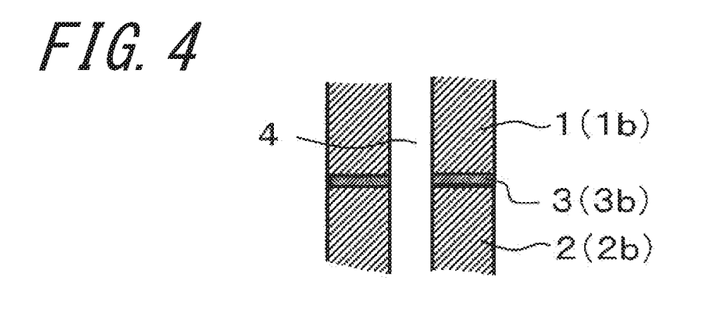
FIG. 4 is a sectional view showing a bonding portion of the ceramic bonded body shown in FIG. 3.

FIG. 1 is a perspective view showing an example of the ceramic bonded body of the disclosure. FIG. 2 is a sectional view showing a bonding portion of the ceramic bonded body shown in FIG. 1. FIG. 3 is a perspective view showing another example of the ceramic bonded body of the disclosure. FIG. 4 is a sectional view showing the bonding portion of the ceramic bonded body shown in FIG. 3. Although reference signs represented by numerals and alphabet are used for identification in the respective drawings, the portions common to the ceramic bonded body of the disclosure are represented by only numerals and described.

The ceramic bonded body 10 of the disclosure shown in FIGS. 1 to 4 comprises a first silicon carbide ceramics 1, a second silicon carbide ceramics 2 and a bonding layer 3 positioned between the first silicon carbide ceramics 1 and the second silicon carbide ceramics 2. As the shapes of the first silicon carbide ceramics 1 and the second silicon carbide ceramics 2, although cylindrical columnar shapes are shown in FIGS. 1 and 2 and cylindrical shapes having through holes 4 are shown in FIGS. 3 and 4, the shapes are not limited to these shapes.

The silicon carbide ceramics constituting the ceramic bonded body 10 of the disclosure is ceramics in which silicon carbide occupies 70 mass % or more assuming all components constituting the ceramics as 100 mass %. In addition, the judgment as to whether the ceramics is silicon carbide ceramics can be confirmed by using the following method. First, the existence of silicon carbide is confirmed by making measurements using an X-ray diffraction (XRD) apparatus and by performing identification using a JCPDS card depending on the obtained value of 2θ (2θ is a diffraction angle). Next, the quantitative analysis of silicon is performed using an ICP (Inductively Coupled Plasma) emission spectroscopic analyzer. Next, the content of the silicon measured using the ICP is calculated in terms of silicon carbide; in the case where the content of the silicon carbide is 70 mass % or more, the ceramics is silicon carbide ceramics.

The bonding layer 3 in the ceramic bonded body 10 of the disclosure contains 25 mass % or more metallic silicon, and 25 mass % or more silicon carbide assuming all components constituting the bonding layer as 100 mass %, and a total of the metallic silicon and the silicon carbide is 75 mass % or more. Since this composition is satisfied, the ceramic bonded body 10 of the disclosure has high bonding strength and durability.

The reason why the ceramic bonded body 10 of the disclosure has high bonding strength is that, since the above-mentioned composition is satisfied, metallic silicon with good wettability with silicon carbide is present around the silicon carbide serving as aggregate, and silicon carbide grains are bonded, and the voids around the silicon carbide grains become scarce. Since the bonding layer 3 contains silicon carbide and the thermal expansion coefficient of the silicon carbide ceramics is nearly equal to that of the bonding layer 3, the ceramic bonded body 10 of the disclosure is also excellent in high-temperature strength.

Moreover, the bonding layer 3 constituting the ceramic bonded body 10 of the disclosure further contains at least one of nickel silicide and chromium silicide. Since this composition is satisfied, the bonding strength of the ceramic bonded body 10 of the disclosure is less prone to be lowered even if the bonded body is exposed to a working environment of corrosive gas and liquid for a long time. Since the bonding strength of the bonded body is less prone to be lowered even if it is exposed to a working environment of corrosive gas and liquid for a long time as described above, the ceramic bonded body 10 of the disclosure is excellent in corrosion resistance. Furthermore, since the ceramic bonded body 10 of the disclosure is excellent in corrosion resistance, in the configuration of the ceramic bonded body 10b shown in FIGS. 3 and 4, the through hole 4 can be used as a flowing passage, and corrosive gas and liquid can be made to flow through this flowing passage.

The reason why the bonding strength of the ceramic bonded body 10 of the disclosure is less prone to be lowered even if the bonded body is exposed to a working environment of corrosive gas and liquid for a long time is that nickel silicide and chromium silicide have high corrosion resistance to acidic and alkaline corrosive gases and liquids.

Furthermore, the bonding strength is improved in the case where the bonding layer 3 contains at least one of nickel silicide and chromium silicide. Although the reason is unknown, it is assumed that nickel silicide and chromium silicide have high chemical affinity to metallic silicon and silicon carbide and are firmly combined with them and that, even if a crack occurs in the bonding layer 3, the development of the crack is blocked by the nickel silicide and the chromium silicide.

Next, a method for confirming the composition of the bonding layer 3 will be described. First, it is possible to confirm whether the bonding layer 3 contains metallic silicon and silicon carbide using an energy dispersive spectrometer (EDS) attached to a scanning electron microscope (SEM). More specifically, the cross section in which the bonding layer 3 can be confirmed is finished to a mirror finished surface using an abrasive agent such as diamond abrasive grains. Next, this mirror finished surface is used as a measuring surface, the bonding layer 3 is observed with the SEM, and the crystal grains confirmed in the observation region and portions other than the crystal grains using the EDS attached to the SEM are irradiated with X-rays. After that, in the case where the existence of silicon and carbon in the crystal grains is confirmed and that the existence of silicon in the portions other than the crystal grains is confirmed, it can be said that the bonding layer 3 contains metallic silicon and silicon carbide.

Furthermore, it is also possible to confirm whether the bonding layer 3 contains metallic silicon and silicon carbide using an electron probe micro analyzer (SPMA). First, the surface analysis of the boding layer 3 on the above-mentioned measuring surface is performed. In the region in which the existence of silicon is confirmed, if a region exists in which the existence of other components (for example, carbon, oxygen, etc.) is not confirmed as the result of the analysis, it can be said that the bonding layer 3 contains metallic silicon. Furthermore, if the region in which the existence of silicon is confirmed is overlapped with the region in which the existence of carbon is confirmed, it can be said that the bonding layer contains silicon carbide.

The following method can be used to confirm whether the bonding layer 3 contains at least one of nickel silicide and chromium silicide. First, the XRD is used to measure the bonding layer 3. After that, identification of the obtained value of 2θ with the JCPDS card can confirm whether the bonding layer contains nickel silicide or chromium silicide. Alternatively, if one of locations of nickel is overlapped with one of locations of silicon in a surface analysis of the bonding layer 3 with EPMA, the bonding layer 3 is assumed to contain nickel silicide. In the same way, the bonding layer 3 is assumed to contain chromium silicide, if one of locations of chromium is overlapped with one of locations of silicon in the surface analysis.

The contents of the nickel silicide and the chromium silicide in the bonding layer 3 may merely be calculated by using the following method. First, it is confirmed that nickel silicide and chromium silicide are contained in the bonding layer 3 by using the above-mentioned method in which the above-mentioned XRD is used, and their chemical formulas are specified. The case in which the chemical formula of the nickel silicide contained in the bonding layer 3 is $NiSi_2$ and the chemical formula of the chromium silicide contained therein is $CrSi_2$ will be described below. Next, the quantitative analysis of nickel (Ni) and chromium (Cr) contained in the bonding layer 3 is performed using the ICP. After that, the content of the nickel measured using the ICP is calculated in terms of $NiSi_2$, whereby the content of $NiSi_2$ can be calculated. Furthermore, the content of the chromium measured using the ICP is calculated in terms of $CrSi_2$, whereby the content of $CrSi_2$ can be calculated.

Next, a method for obtaining the contents of the metallic silicon and the silicon carbide in the bonding layer 3 will be described below. In the following description, the case in which carbides other than silicon carbide are not contained will be described. First, the content of the entire silicon (Si) contained in the bonding layer 3 is obtained using the ICP. Next, the content of the carbon (C) contained in the bonding layer 3 is obtained by making measurement using a carbon analyzer. Then, the content of silicon carbide (SiC) is obtained by calculating the content value of C in terms of SiC.

Next, the content of Si in the SiC is obtained by subtracting the content of C from the content of SiC. Furthermore, the contents of Si in $NiSi_2$ and $CrSi_2$ are similarly obtained from the contents of $NiSi_2$ and $CrSi_2$ calculated by using the above-mentioned measurement method. And then, the content of metallic silicon (Si) can be obtained by subtracting the contents of Si in SiC, $NiSi_2$ and $CrSi_2$ from the content of entire silicon contained in the bonding layer 3 obtained by making measurement using the ICP, assuming that silicon other than SiC, $NiSi_2$ and $CrSi_2$ is metallic.

Furthermore, in the ceramic bonded body 10 of the disclosure, the total content of the nickel silicide and the chromium silicide in the bonding layer 3 may be 2 mass % or more and 18 mass % or less in terms of $NiSi_2$ and $CrSi_2$ assuming all components constituting the bonding layer 3 as 100 mass %. In the case where this composition is satisfied, the ceramic bonded body 10 of the disclosure has higher bonding strength and corrosion resistance.

Moreover, in the ceramic bonded body 10 of the disclosure, the dispersion degree of the nickel silicide and the chromium silicide in the bonding layer 3 may be not less than 0.4 and not more than 0.8. In the case where this composition is satisfied, the nickel silicide and chromium silicide are present while being dispersed appropriately in the bonding layer 3, whereby the ceramic bonded body 10 of the disclosure is more excellent in corrosion resistance.

The dispersion degree is herein a value obtained by dividing the standard deviation of the distance between the centers of gravity by the average value of the distance between the centers of gravity, the value being derived by analyzing the image obtained by observing the cross section of the bonding layer 3 by using a method referred to as the gravity center distance method of image analysis software "A-ZO KUN" (registered trademark, produced by Asahi Kasei Engineering Corporation). The image obtained by observing the cross section of the bonding layer 3 indicates an image obtained by incorporating a photograph in which nickel silicide and chromium silicide are painted in black in a photograph taken after the cross section wherein the bonding layer 3 can be confirmed is finished to a mirror finished surface using an abrasive agent such as diamond abrasive grains and this mirror finished surface is observed using a metallurgical microscope at 500-fold magnification. Furthermore, as analysis conditions, for example, it may merely be set that the brightness of grains is "dark", that the method of binarization is "manual", that the elimination of small figures is "0 μm" and that the threshold is 1.2 to 1.6 times the peak value of the histogram indicating the brightness of each point (each pixel) in the image.

Moreover, the bonding layer 3 in the ceramic bonded body 10 of the disclosure may contain silicon carbide grains, and the dispersion degree of the silicon carbide grains may be not less than 0.3 and not more than 0.9. The silicon carbide grains are herein crystal grains in which the existence of silicon and carbon has been confirmed using the EDS in the method for confirming the composition of the above-mentioned bonding layer 3.

Furthermore, if this composition is satisfied, since the silicon carbide grains exist while being dispersed appropriately in the bonding layer 3, even if a crack occurs in the bonding layer 3 and is developed, the development thereof is blocked by the silicon carbide grains. Hence, the ceramic bonded body 10 of the disclosure has higher bonding strength.

For the purpose of calculating the dispersion degree of the silicon carbide grains, a method similar to that used to calculate the dispersion degrees of nickel silicide and chromium silicide may merely be executed using an image obtained by incorporating a photograph in which silicon carbide grains are painted in black.

Furthermore, in the bonding layer 3 of the ceramic bonded body 10 of the disclosure, the area ratio occupied by nickel silicide and chromium silicide having an equivalent circle diameter of 10 μm or more may be not less than 7 area % and not more than 39 area %. If this composition is satisfied, the ceramic bonded body 10 of the disclosure maintains high bonding strength, and even if a crack occurs in the bonding layer 3 and is developed, since the nickel silicide and chromium silicide having an equivalent circle diameter of 10 μm have a function of blocking the development of the crack, the ceramic bonded body has further higher bonding strength.

The area ratio occupied by nickel silicide and chromium silicide having an equivalent circle diameter of 10 μm or more in the bonding layer 3 can be obtained by applying the particle analyzing method of the image analysis software "A-ZO KUN" as in the case where the dispersion degrees of nickel silicide and chromium silicide are calculated.

Moreover, in the ceramic bonded body 10 of the disclosure, the porosity in the bonding layer 3 may be 0.8% or less. If this composition is satisfied, pores serving as starting points of cracks are reduced in the bonding layer 3, whereby the ceramic bonded body 10 of the disclosure has still further higher bonding strength. Furthermore, in the case where the porosity in the bonding layer 3 is 0.8% or less, since the surface area of the bonding layer 3 is reduced, when the bonding layer is exposed to a working environment of corrosive gas and liquid, the penetration speed of the corrosive gas and liquid into the bonding layer 3 is lowered. Hence, in the case where the porosity in the bonding layer 3 is 0.8% or less, the bonding layer has higher corrosion resistance.

The porosity in the bonding layer 3 can be obtained by applying the particle analyzing method of the image analysis software "A-ZO KUN" as in the case where the dispersion degrees of nickel silicide and chromium silicide are calculated.

Next, an example of a method for producing the ceramic bonded body 10 of the disclosure will be described.

First, the first silicon carbide ceramics 1 and the second silicon carbide ceramics 2 are prepared. Next, metallic powder selected from at least one of metallic silicon powder, silicon carbide powder, nickel powder and chromium powder, an organic solvent, such as terpineol, and ethyl cellulose or acrylic binder are put in the container of a stirring defoaming apparatus. After that, the container is rotated to perform stirring and defoaming, thereby preparing a paste to be formed into the bonding layer 3.

At this time, the ratios of the respective powder materials (metallic silicon powder, silicon carbide powder and metallic powder) are adjusted, assuming all components constituting the bonding layer 3 as 100 mass %, so that the ratio of the metallic silicon is 25 mass % or more, so that the ratio of the silicon carbide is 25 mass % or more, so that the ratio of the total of metallic silicon and silicon carbide is 75 mass % or more, and so that the rest is at least one of nickel silicide and chromium silicide.

Moreover, the additive amounts of the organic solvent and the binder are for example 1.2 to 23.3 mass parts and 3.1 to 32.7 mass parts, respectively, when the total amount of the respective powder materials (metallic silicon powder, silicon carbide powder and metallic powder) is 100 mass parts.

Furthermore, the average particle diameter of the metallic powder is 8 μm or less, and when the metallic powder having this small average particle diameter is used, nickel and chromium react with the metallic silicon more sufficiently, thereby being formed into nickel silicide and chromium silicide, respectively.

Next, after applying the paste to be formed into the bonding layer 3 to at least one of the bonding faces of the first silicon carbide ceramics 1 and the second silicon carbide ceramics 2, the respective bonding faces face together, and pressure is applied from a direction perpendicular to the bonding faces. For the application of pressure, the own weight of the first silicon carbide ceramics 1 or the second silicon carbide ceramics 2 may be used.

Next, the paste to be formed into the bonding layer 3 is dried under the conditions that the retention temperature is not lower than 80° C. and not higher than 300° C. and that the retention time is not shorter than 4 hours and not longer than 16 hours. After that, heat treatment is performed under the conditions that the pressure is 1 atm, the retention temperature is not lower than 1400° C. and not higher than 1500° C. and that the retention time is not shorter than 30 minutes and not longer than 90 minutes under vacuum atmosphere or inert gas atmosphere, such as argon atmosphere, whereby the ceramic bonded body 10 of the disclosure is obtained.

Still further, in order to adjust the dispersion degrees of the nickel silicide and the chromium silicide in the bonding layer 3 to not less than 0.4 and not more than 0.8, when the paste to be formed into the bonding layer 3 is produced, 0.1 to 1.0 mass parts of a dispersant may be added to the total amount of 100 mass parts of the respective powder materials (metallic silicon powder, silicon carbide powder and metallic powder). In the case where the dispersant is added in this way, the nickel silicide and the chromium silicide can be caused to be present while being dispersed without being aggregated.

Furthermore, in order to adjust the dispersion degree of the silicon carbide grains in the bonding layer 3 to not less than 0.3 and not more than 0.9, when the paste to be formed into the bonding layer 3 is produced, silicon carbide powder having an average particle diameter of 2 to 10 μm may be used, and 0.1 to 1.0 mass parts of a dispersant may be added to the total amount of 100 mass parts of the respective powder materials (metallic silicon powder, silicon carbide powder and metallic powder).

Moreover, in order to adjust the area ratio occupied by the nickel silicide and the chromium silicide having an equivalent circle diameter of 10 μm or more in the bonding layer 3 to not less than 7 area % and not more than 39 area %, when the paste to be formed into the bonding layer 3 is produced, metallic powder adjusted so that nickel powder and chromium powder having an equivalent circle diameter of 5 μm or more is set to not less than 5 mass % and not more than 30 mass % may be used.

Still further, in order to set the porosity in the bonding layer 3 to 0.08% or less, the bonding layer may be produced under the following conditions. First, only chromium powder is used as metallic powder. In the case where only the chromium powder is used in this way, since chromium reacts with metallic silicon more rapidly than nickel and silicide is formed in the initial stage of the heat treatment, molten metallic silicon easily fills the pores after the initial stage of the heat treatment. And then, the stirring defoaming apparatus is operated so as rotate clockwise at a rotation speed of 2000 rpm for 2 to 20 minutes and then operated so as to rotate counterclockwise at a rotation speed of 2200 rpm for 2 to 20 minutes, whereby the porosity in the bonding layer 3 becomes 0.8% or less.

Although examples of the disclosure will be described below specifically, the disclosure is not limited by these examples.

Example 1

The first silicon carbide ceramics and the second silicon carbide ceramics having a rectangular columnar shape were prepared. In a ceramic bonded body to be produced in Example 1, the thickness of the bonding layer was 200 μm, and the ceramic bonded body was formed into a shape from which a test piece having dimensions conforming to JIS R 1624-2010 and having a bonding layer positioned at the center was capable of being cut out.

Next, metallic silicon powder, silicon carbide powder having an average particle diameter of 1 μm, nickel powder or chromium powder having an average particle diameter of 4 μm, terpineol serving as an organic solvent, and ethyl cellulose serving as a binder were put in a container of a stirring defoaming apparatus, and then the container was rotated to perform stirring and defoaming, thereby producing paste to be formed into a bonding layer.

At this time, the ratios of the metallic silicon powder, the silicon carbide powder and the nickel powder or the chromium powder were adjusted so that the metallic silicon, the silicon carbide, the nickel silicide or the chromium silicide had the contents shown in Table 1 assuming all components constituting the bonding layer as 100 mass %. Furthermore, the amounts of the organic solvent and the binder were set to 15.3 mass parts and 7.6 mass parts, respectively, when the total amount of the respective powder materials (metallic silicon powder, silicon carbide powder and nickel powder or chromium powder) was 100 mass parts.

The stirring using the stirring defoaming apparatus was performed by clockwise rotation at a rotation speed of 2000 rpm for 10 minutes and by counterclockwise rotation at a rotation speed of 2200 rpm for 1 minute, thereby obtaining paste.

Next, the paste to be formed into the bonding layer was applied to the end face of the first silicon carbide ceramics to be used as a bonding face so that the thickness of the bonding layer was set to 200 μm, and the second silicon carbide ceramics was placed and pressure was applied.

After that, drying was performed at a temperature of 270° C. for 6 hours, and then heat treatment was performed under the conditions that the pressure was 1 atm, that the retention temperature was 1450° C. and that the retention time was 60 minutes in argon atmosphere, whereby a bonded body in which the first silicon carbide ceramics was bonded to the second silicon carbide ceramics was obtained.

Next, the bonding layer in each sample was measured using the XRD, and identification was performed using the JCPDS card depending on the obtained value of 2θ. As a result, the existence of both nickel silicide and chromium silicide was not confirmed in sample Nos. 1 to 4. On the other hand, the existence of $NiSi_2$ was confirmed in sample Nos. 5 to 10, and the existence of $CrSi_2$ was confirmed in sample Nos. 11 to 16.

Next, the contents of $NiSi_2$ and $CrSi_2$ were calculated in sample Nos. 5 to 16. First, quantitative analysis was performed for the nickel and chromium contained in the bonding layer using the ICP. After that, the content of the nickel measured using the ICP was calculated in terms of $NiSi_2$, whereby the content of $NiSi_2$ was calculated. Furthermore, the content of the chromium measured using the ICP was calculated in terms of $CrSi_2$, whereby the content of $CrSi_2$ was calculated.

Next, a test piece having dimensions conforming to JIS R 1624-2010 and having a bonding layer positioned at the center was cut out from each sample, and four-point bending strength $\sigma_0$ was measured at normal temperature according to JIS R 1624-2010.

Next, after the test piece having dimensions conforming to JIS R 1624-2010 and having the bonding layer positioned at the center was cut out from each sample, the test piece was immersed in anticorrosive liquid (pH approximately 8.9) at a temperature of 90° C., the liquid being prepared by adding 2 g of Orguard F-420 (ingredients: molybdate, organic nitrogen-based germicide, azole compound, etc.) which was produced by Organo Corporation and served as a corrosion preventive dispersant for cooling water, to 1 liter of city water. After 30 days, the test pieces were taken out, and four-point bending strengths $\sigma_1$ of the test pieces were measured at normal temperature. In addition, there was calculated the lowering rate of the four-point bending strength $\Delta\sigma(\%)=(\sigma_0-\sigma_1)/\sigma_0\times100$.

The results are shown in Table 1.

TABLE 1

| Sample No. | Metallic silicon (mass %) | Silicon carbide (mass %) | Metal silicide Chemical formula | Content (mass %) | 4-point bending strength $\sigma_0$ (MPa) | $\sigma_1$ (MPa) | Lowering rate of 4-point bending strength $\Delta\sigma$ (%) |
|---|---|---|---|---|---|---|---|
| *1  | 18 | 82 | —     | 0 | 135 | 90  | 33.3 |
| *2  | 82 | 18 | —     | 0 | 129 | 89  | 31.0 |
| *3  | 25 | 75 | —     | 0 | 151 | 105 | 30.5 |
| *4  | 75 | 25 | —     | 0 | 146 | 105 | 28.1 |
| *5  | 76 | 23 | $NiSi_2$ | 1 | 186 | 173 | 7.0 |
| 6   | 74 | 25 | $NiSi_2$ | 1 | 205 | 190 | 7.3 |
| 7   | 59 | 40 | $NiSi_2$ | 1 | 203 | 187 | 7.9 |
| 8   | 42 | 57 | $NiSi_2$ | 1 | 206 | 191 | 7.3 |
| 9   | 25 | 74 | $NiSi_2$ | 1 | 202 | 187 | 7.4 |
| *10 | 23 | 76 | $NiSi_2$ | 1 | 186 | 171 | 8.1 |
| *11 | 76 | 23 | $CrSi_2$ | 1 | 192 | 179 | 6.8 |
| 12  | 74 | 25 | $CrSi_2$ | 1 | 212 | 199 | 6.1 |
| 13  | 59 | 40 | $CrSi_2$ | 1 | 213 | 199 | 6.6 |
| 14  | 42 | 57 | $CrSi_2$ | 1 | 213 | 200 | 6.1 |
| 15  | 25 | 74 | $CrSi_2$ | 1 | 215 | 201 | 6.5 |
| *16 | 23 | 76 | $CrSi_2$ | 1 | 190 | 177 | 6.8 |

Asterisk (*) denotes departure from the scope of the disclosure

According to the results shown in Table 1, the lowering rates of the four-point bending strength $\Delta\sigma$ of sample Nos. 5 to 16 containing at least one of nickel silicide and chromium silicide in the bonding layer were smaller than those of samples Nos. 1 to 4 not containing nickel silicide or chromium silicide in the bonding layer. Furthermore, among sample Nos. 5 to 16, sample Nos. 6 to 9 and 12 to 15, which contained 25 mass % or more metallic silicon, 25 mass % or more silicon carbide and the total of metallic silicon and silicon carbide in the bonding layer was 75 mass % or more, had high four-point bending strengths $\sigma_0$, 200 MPa or more. From these results, it was found that sample Nos. 6 to 9 and 12 to 15 had excellent durability and corrosion resistance.

Example 2

Next, samples being different in the content of nickel silicide or chromium silicide in the bonding layer were prepared and were evaluated with respect to durability and corrosion resistance. As a preparation method, sample Nos. 17 to 28 were prepared by using a method similar to the preparation method in Example 1, except that the ratios of metallic silicon powder, silicon carbide powder and nickel powder or chromium powder were adjusted so that the nickel silicide or chromium silicide in the bonding layer had the content shown in Table 2. Sample No. 17 is the same as sample No. 8 in Example 1, and sample No. 23 is the same as sample No. 14 in Example 1.

Furthermore, as in the case of Example 1, the content of $NiSi_2$ or $CrSi_2$ was calculated, the four-point bending strengths $\sigma_0$ and $\sigma_1$ were measured, and the lowering rates of the four-point bending strengths $\Delta\sigma$ were calculated. The results are shown in Table 2.

TABLE 2

| Sample No. | Metal silicide Chemical formula | Content (mass %) | 4-point bending strength $\sigma_0$ (MPa) | $\sigma_1$ (MPa) | Lowering rate of 4-point bending strength $\Delta\sigma$ (%) |
|---|---|---|---|---|---|
| 17 | $NiSi_2$ | 1  | 206 | 191 | 7.3 |
| 18 | $NiSi_2$ | 2  | 222 | 209 | 5.9 |
| 19 | $NiSi_2$ | 5  | 223 | 210 | 5.8 |
| 20 | $NiSi_2$ | 8  | 225 | 212 | 5.8 |
| 21 | $NiSi_2$ | 18 | 223 | 210 | 5.8 |
| 22 | $NiSi_2$ | 19 | 200 | 185 | 7.5 |
| 23 | $CrSi_2$ | 1  | 213 | 200 | 6.1 |
| 24 | $CrSi_2$ | 2  | 230 | 218 | 5.2 |
| 25 | $CrSi_2$ | 5  | 232 | 220 | 5.2 |
| 26 | $CrSi_2$ | 8  | 233 | 221 | 5.2 |
| 27 | $CrSi_2$ | 18 | 231 | 218 | 5.6 |
| 28 | $CrSi_2$ | 19 | 212 | 198 | 6.6 |

According to the results shown in Table 2, sample Nos. 18 to 21 and 24 to 27 had high four-point bending strengths $\sigma_0$ of 220 MPa or more, and had low lowering rates of the four-point bending strengths $\Delta\sigma$ of 6% or less. From these results, it was found that ceramic bonded bodies containing not less than 2 mass % and not more than 18 mass % of $NiSi_2$ and $CrSi_2$ in the bonding layer had more excellent durability and corrosion resistance.

Example 3

Next, samples being different in the dispersion degree of nickel silicide or chromium silicide in the bonding layer were prepared and evaluated with respect to durability and corrosion resistance. As a preparation method, sample Nos. 29 to 38 were prepared by using a method similar to the preparation method in Example 2, except that the dispersant having the amount shown in Table 3 was added to the total amount of 100 mass parts of the respective powder materials (metallic silicon powder, silicon carbide powder and nickel powder or chromium powder) when the paste to be formed into the bonding layer was prepared. Sample No. 29 is the same as sample No. 19 in Example 2, and sample No. 34 is the same as sample No. 25 in Example 2.

Next, the dispersion degree of nickel silicide or chromium silicide in the bonding layer of each sample was calculated by using the following method. First, the bonding layer of each sample was cut off, and a cut surface thereof was finished to a mirror finished surface using an abrasive agent such as diamond abrasive grains. Next, this mirror finished surface was observed with a metallurgical microscope at 500-fold magnification and photographed. After that, in this photograph, nickel silicide and chromium silicide were painted in black, and this was analyzed by using the method referred to as the gravity center distance method of the image analysis software "A-ZO KUN", whereby the dispersion degree of nickel silicide or chromium silicide was calculated. As analysis conditions, the brightness of grains was set to "dark", the method of binarization was set to "manual", the elimination of small figures was set to "0 μm" and the threshold was set to 1.35 times the peak value of the histogram indicating the brightness of each point in the image.

And then, as in the case of Example 1, the four-point bending strengths $\sigma_0$ and $\sigma_1$ were measured, and the lowering rate of the four-point bending strengths $\Delta\sigma$ was calculated. The results are shown in Table 3.

TABLE 3

| Sample No. | Metal silicide Chemical formula | Content (mass %) | Dispersant (mass parts) | Dispersion degree of metal silicide | 4-point bending strength $\sigma_0$ (MPa) | $\sigma_1$ (MPa) | Lowering rate of 4-point bending strength $\Delta\sigma$ (%) |
|---|---|---|---|---|---|---|---|
| 29 | $NiSi_2$ | 5 | 0 | 0.37 | 223 | 210 | 5.8 |
| 30 | $NiSi_2$ | 5 | 0.1 | 0.4 | 230 | 220 | 4.3 |
| 31 | $NiSi_2$ | 5 | 0.3 | 0.65 | 231 | 222 | 3.9 |
| 32 | $NiSi_2$ | 5 | 0.5 | 0.79 | 231 | 222 | 3.9 |
| 33 | $NiSi_2$ | 5 | 1 | 0.8 | 231 | 222 | 3.9 |
| 34 | $CrSi_2$ | 5 | 0 | 0.38 | 232 | 220 | 5.2 |
| 35 | $CrSi_2$ | 5 | 0.1 | 0.41 | 233 | 223 | 4.3 |
| 36 | $CrSi_2$ | 5 | 0.3 | 0.55 | 233 | 224 | 3.9 |

TABLE 3-continued

| Sample No. | Metal silicide Chemical formula | Content (mass %) | Dispersant (mass parts) | Dispersion degree of metal silicide | 4-point bending strength $\sigma_0$ (MPa) | $\sigma_1$ (MPa) | Lowering rate of 4-point bending strength $\Delta\sigma$ (%) |
|---|---|---|---|---|---|---|---|
| 37 | $CrSi_2$ | 5 | 0.5 | 0.79 | 233 | 224 | 3.9 |
| 38 | $CrSi_2$ | 5 | 1 | 0.8 | 233 | 224 | 3.9 |

According to the results shown in Table 3, sample Nos. 30 to 33 and 35 to 38 had low lowering rates of the four-point bending strengths Δσ of 4.3% or less. From these results, it was found that ceramic bonded bodies containing nickel silicide or chromium silicide in the bonding layer at a dispersion degree of not less than 0.4 and not more than 0.8 had further more excellent corrosion resistance.

Example 4

Next, samples being different in the dispersion degree of silicon carbide grains in the bonding layer were prepared and evaluated with respect to durability and corrosion resistance. As a preparation method, sample Nos. 39 to 50 were prepared by using a method similar to the preparation method in Example 3, except that silicon carbide powder having the average particle diameter shown in Table 4 was used and that the dispersant having the amount shown in Table 4 was added to the total amount of 100 mass parts of the respective powder materials (metallic silicon powder, silicon carbide powder and nickel powder or chromium powder) when the paste to be formed into the bonding layer was prepared. Sample No. 39 is the same as sample No. 30 in Example 3, and sample No. 45 is the same as sample No. 35 in Example 3.

Next, the dispersion degree of silicon carbide grains in the bonding layer of each sample was calculated by using a method similar to the method that was used to calculate the dispersion degrees of nickel silicide and chromium silicide in Example 3, except that a photograph in which silicon carbide grains were painted in black was used.

And then, as in the case of Example 1, the four-point bending strengths $\sigma_0$ and $\sigma_1$ were measured, and the lowering rate of the four-point bending strengths Δσ was calculated. The results are shown in Table 4.

TABLE 4

| Sample No. | Metal silicide Chemical formula | Content (mass %) | Dispersant (mass part) | Average grain diameter of silicon carbide powder (μm) | Dispersion degree of silicon carbide grains | 4-point bending strength $\sigma_0$ (MPa) | $\sigma_1$ (MPa) | Lowering rate of 4-point bending strength $\Delta\sigma$ (%) |
|---|---|---|---|---|---|---|---|---|
| 39 | $NiSi_2$ | 5 | 0.1 | 1 | 0.24 | 230 | 220 | 4.3 |
| 40 | $NiSi_2$ | 5 | 0.1 | 5 | 0.3 | 237 | 228 | 3.8 |
| 41 | $NiSi_2$ | 5 | 0.3 | 5 | 0.4 | 238 | 229 | 3.8 |
| 42 | $NiSi_2$ | 5 | 0.5 | 5 | 0.53 | 239 | 230 | 3.8 |
| 43 | $NiSi_2$ | 5 | 0.8 | 5 | 0.87 | 239 | 230 | 3.8 |
| 44 | $NiSi_2$ | 5 | 1 | 5 | 0.89 | 239 | 230 | 3.8 |
| 45 | $CrSi_2$ | 5 | 0.1 | 1 | 0.28 | 233 | 223 | 4.3 |
| 46 | $CrSi_2$ | 5 | 0.1 | 5 | 0.31 | 240 | 231 | 3.8 |
| 47 | $CrSi_2$ | 5 | 0.3 | 5 | 0.41 | 241 | 232 | 3.7 |
| 48 | $CrSi_2$ | 5 | 0.5 | 5 | 0.53 | 243 | 234 | 3.7 |
| 49 | $CrSi_2$ | 5 | 0.8 | 5 | 0.89 | 243 | 234 | 3.7 |
| 50 | $CrSi_2$ | 5 | 1 | 5 | 0.9 | 243 | 234 | 3.7 |

According to the results shown in Table 4, sample Nos. 40 to 44 and 46 to 50 had high four-point bending strengths $\sigma_0$ of 237 MPa or more. From these results, it was found that ceramic bonded bodies containing silicon carbide grains in the bonding layer at a dispersion degree of not less than 0.3 and not more than 0.9 had still further more excellent durability.

Example 5

Next, samples being different in the area ratio occupied by nickel silicide and chromium silicide having an equivalent circle diameter of 10 μm or more in the bonding layer were prepared and evaluated with respect to durability and corrosion resistance. As a preparation method, sample Nos. 51 to 60 were prepared by using a method similar to the preparation method in Example 4, except that the amounts of the nickel powder and chromium powder having an equivalent circle diameter of 5 μm or more were adjusted to the amounts shown in Table 5. Sample No. 51 is the same as sample No. 41 in Example 4, and sample No. 56 is the same as sample No. 47 in Example 4.

Next, the area ratio occupied by nickel silicide and chromium silicide having an equivalent circle diameter of 10 μm or more in the bonding layer of each sample was calculated by applying the particle analyzing method of the image analysis software "A-ZO KUN" as in the case where the dispersion degrees of nickel silicide and chromium silicide were calculated in Example 3.

And then, as in the case of Example 1, the four-point bending strengths $\sigma_0$ and $\sigma_1$ were measured, and the lowering rate of the four-point bending strengths $\Delta\sigma$ was calculated. The results are shown in Table 5.

TABLE 5

| Sample No. | Metal silicide Chemical formula | Content (mass %) | Ratio of metal powder having equivalent circle diameter of 5 μm or more (mass %) | Area ratio of metal silicide having equivalent circle diameter of 10 μm or more (area %) | 4-point bending strength $\sigma_0$ (MPa) | $\sigma_1$ (MPa) | Lowering rate of 4-point bending strength $\Delta\sigma$ (%) |
|---|---|---|---|---|---|---|---|
| 51 | NiSi$_2$ | 5 | 32 | 41 | 238 | 229 | 3.8 |
| 52 | NiSi$_2$ | 5 | 30 | 39 | 252 | 243 | 3.6 |
| 53 | NiSi$_2$ | 5 | 18 | 26 | 253 | 244 | 3.6 |
| 54 | NiSi$_2$ | 5 | 5 | 7 | 253 | 244 | 3.6 |
| 55 | NiSi$_2$ | 5 | 4 | 6 | 240 | 229 | 4.6 |
| 56 | CrSi$_2$ | 5 | 31 | 42 | 241 | 232 | 3.7 |
| 57 | CrSi$_2$ | 5 | 29 | 38 | 254 | 245 | 3.5 |
| 58 | CrSi$_2$ | 5 | 16 | 28 | 256 | 247 | 3.5 |
| 59 | CrSi$_2$ | 5 | 6 | 7 | 256 | 247 | 3.5 |
| 60 | CrSi$_2$ | 5 | 4 | 6 | 240 | 229 | 4.6 |

According to the results shown in Table 5, sample Nos. 52 to 54 and 57 to 59 had high four-point bending strengths $\sigma_0$ of 252 MPa or more. From these results, it was found that ceramic bonded bodies in which the area ratio occupied by nickel silicide and chromium silicide having an equivalent circle diameter of 10 μm or more was not less than 7 area % and not more than 39 area % in the bonding layer had even still further more excellent durability.

Example 6

Next, samples being different in porosity in the bonding layer were prepared and evaluated with respect to durability and corrosion resistance. As a preparation method, sample Nos. 61 to 65 were prepared by using a method similar to the method for preparing sample No. 26 in Example 2, except that the time during which counterclockwise rotation was performed for stirring using the stirring defoaming apparatus was set to the value shown in Table 6. Sample No. 61 is the same as sample No. 26 in Example 2.

The porosity in the bonding layer of each sample was calculated by using a method similar to that used to calculate the area ratio occupied by nickel silicide and chromium silicide having an equivalent circle diameter of 10 μm or more in Example 5.

And then, as in the case of Example 1, the four-point bending strengths $\sigma_0$ and $\sigma_1$ were measured, and the lowering rate of the four-point bending strengths $\Delta\sigma$ was calculated.

The results are shown in Table 6.

TABLE 6

| Sample No. | Rotation time (minute) | Porosity | 4-point bending strength $\sigma_0$ (MPa) | $\sigma_1$ (MPa) | Lowering rate of 4-point bending strength $\Delta\sigma$ (%) |
|---|---|---|---|---|---|
| 61 | 1 | 1.0 | 233 | 221 | 5.2 |
| 62 | 2 | 0.7 | 242 | 232 | 4.1 |
| 63 | 10 | 0.3 | 244 | 233 | 4.5 |
| 54 | 20 | 0.8 | 241 | 231 | 4.1 |
| 65 | 22 | 1.0 | 228 | 214 | 6.1 |

According to the results shown in Table 6, sample Nos. 62 to 64 had high four-point bending strengths $\sigma_0$ of 240 MPa or more, and low lowering rates of the four-point bending strengths $\Delta\sigma$ of 5% or less. From these results, it was found that ceramic bonded bodies having a porosity of 0.8% or less in the bonding layer had more and more excellent durability and corrosion resistance.

REFERENCE SIGNS LIST

1: First silicon carbide ceramics
2: Second silicon carbide ceramics
3: Bonding layer
4: Through hole

What is claimed is:
1. A ceramic bonded body, comprising:
a first silicon carbide ceramics;
a second silicon carbide ceramics; and
a bonding layer located between the first silicon carbide ceramics and the second silicon carbide ceramics,
the bonding layer containing, with respect to 100 mass % of all components in the bonding layer,
25 mass % or more of metallic silicon, and
25 mass % or more of silicon carbide, wherein a total of the metallic silicon and the silicon carbide is 75 mass % or more,
the bonding layer further containing at least one of nickel silicide and chromium silicide, and
wherein a porosity in the bonding layer is 0.8% or less.
2. The ceramic bonded body according to claim 1, wherein a total content of the nickel silicide and the chro- mium silicide is 2 mass % or more and 18 mass % or less in terms of $NiSi_2$ and $CrSi_2$ with respect to 100 mass % of all components in the bonding layer.

3. The ceramic bonded body according to claim 1, wherein
the bonding layer comprises at least one of nickel silicide and chromium silicide, and
a dispersion degree of the nickel silicide and the chromium silicide is 0.4 or more and 0.8 or less.

4. The ceramic bonded body according to claim 1, wherein the bonding layer contains silicon carbide grains, and a dispersion degree of the silicon carbide grains is 0.3 or more and 0.9 or less.

5. The ceramic bonded body according to claim 1, wherein
the bonding layer comprises at least one of nickel silicide and chromium silicide, and
an area ratio occupied by the nickel silicide and the chromium silicide which have an equivalent circle diameter of 10 μm or more in the bonding layer is 7 area % or more and 39 area % or less.

* * * * *

UNITED STATES PATENT AND TRADEMARK OFFICE
CERTIFICATE OF CORRECTION

PATENT NO. : 10,689,300 B2
APPLICATION NO. : 15/763457
DATED : June 23, 2020
INVENTOR(S) : Kiyotaka Nakamura et al.

Page 1 of 1

It is certified that error appears in the above-identified patent and that said Letters Patent is hereby corrected as shown below:

In the Specification

Column 3, Line 53, change '(SPMA)' to -- (EPMA) --.

Signed and Sealed this
Twenty-seventh Day of February, 2024

Katherine Kelly Vidal
*Director of the United States Patent and Trademark Office*